United States Patent [19]

Devore et al.

[11] 3,774,154

[45] Nov. 20, 1973

[54] ERROR CONTROL CIRCUITS AND METHODS

[75] Inventors: Ernest W. Devore, Boulder; Phil H. Hall, Longmont, both of Colo.

[73] Assignee: International Business Machines Corporation, Armonk, N.Y.

[22] Filed: Aug. 21, 1972

[21] Appl. No.: 282,619

[52] U.S. Cl. .................. 340/146.1 F, 235/153 AM, 340/146.1 AI, 340/174 ED, 340/174.1 B

[51] Int. Cl. .... G06k 5/02, G11b 27/36, G11c 29/00

[58] Field of Search ............................ 235/153 AM; 340/146.1 AL, 146.1 F, 174 ED, 174.1 B

[56] References Cited

UNITED STATES PATENTS

| | | | |
|---|---|---|---|
| 3,675,200 | 7/1972 | Bossen et al. | 340/146.1 F |
| 3,639,900 | 2/1972 | Hinz | 340/174.1 B X |

OTHER PUBLICATIONS

Cannon, M. R. Enhanced Error Correction. In IBM Tech. Disc. Bull. 14(4): p. 1171–1172. Sept. 1971.

*Primary Examiner*—Eugene G. Botz
*Assistant Examiner*—R. Stephen Dildine, Jr.
*Attorney*—Herbert F. Somermeyer et al.

[57] ABSTRACT

A digital magnetic recording system or a signal transmission system employs an error detection and correction code capable of correcting k+n error conditions (k and n are positive integers) whenever quality signals point to an error-prone condition. Such error correction code can detect and correct k errors without pointers in a given set of data signals. At the transmitter, or during a recording operation, the recording of signal transfer is monitored. In addition, signals are recovered and processed through error detection and correction circuits for pointing to said k error conditions. Such k error conditions are then compared with the error-prone condition signals. An okay signal is provided if there are no errors or if there are k error conditions wherein the error locations within a set of data signals are pointed to both by the error-prone condition signals and the error correction code. An error condition exists if there are k+n (k=1 or more) or more errors or if the comparison for k error conditions is not met.

10 Claims, 2 Drawing Figures

ERROR CONTROL CIRCUITS AND METHODS

DOCUMENTS INCORPORATED BY REFERENCE

Hinz, Jr., U. S. Pat. No. 3,639,900, issued Feb. 1, 1972, and entitled "Enhanced Error Detection and Correction for Data Systems."

Bossen U. S. Pat. No. 3,629,824, issued December 21, 1971, and entitled "Apparatus for Multiple-Error Correcting Codes."

Irwin U. S. Pat. No. 3,624,637 (Irwin '637), issued Nov. 30, 1971, and entitled "Digital Code to Digital Code Conversions."

Floros U. S. Pat. No. Re 25,527, issued Mar. 3, 1964, and entitled "Deskewing System."

Vermuelen U. S. Pat. No. 3,548,327, issued Dec. 15, 1970, and entitled "System for Detection of Digital Data by Integration."

Irwin U. S. Pat. No. 3,654,617 (Irwin '617), issued Apr. 4, 1972, and entitled "Microprogrammable I/O Controller."

BACKGROUND OF THE INVENTION

The present invention relates to error control circuits useful with communication systems and, more particularly, communication systems having magnetic recording devices including read-after-record verification circuits.

Many present-day digital recorders are used in connection with data processing equipment. Additionally, such data recorders are also used in connection with digital data communication systems or in combination with both types of systems. Based upon the characteristics of the system with which the digital data recorder is to operate, the data rate will vary. The trend is toward higher and higher data rates. With higher data rates, the reliability of the digital data recorder must be higher to enable substantial data throughput.

In present-day digital data recorders, particularly those used with data processing equipment, the data recorder operates in a start/stop mode; that is, there are rapid high-acceleration starts with short periods of data recording/reading followed by a short stop, with the cycle being repeated at a relatively high rate. As a result of such start/stop operation, media-to-transducer relationships are subject to variations which degrade the recording and readback operations; that is, media-to-transducer relationships may include liftoff from the transducer, skewing, and the like. Additionally, because of such operations, debris tends to be generated and collects on the media from electrostatic attraction, for example. This debris can cause separation of the media and the transducer resulting in a temporary dropout of signals during the readback operations. This becomes more and more acute as the recording density on the magnetic media is increased. For example, during the first days of digital data recording, the recording density of 200 bytes per inch (bpi) was quite common. The density has continually increased from 200 bpi to higher than 1,600 bpi. This has resulted in a higher error rate with the same conditions of media transport. For example, at a recording density of 10,000 bpi, the fringing flux of the recorded data signals in the media is much less than at 200 bpi; hence, media/transducer relationships become more critical. As these become more critical, reliable readback becomes more problematical. To compensate for such increased error rates, higher quality readback systems are employed. In addition, error detection and correction techniques (ECC) are used to enable readback without stopping the tape and then re-reading a poorly read portion. With the application of block ECC codes, such as that shown in the Bossen patent, supra, a greater error correcting capability resides in the digital data recorder. For example, with parity ECC, one track in error (TIE) out of a plurality of tracks (either seven or nine) could be corrected without stopping the tape. With the Bossen code and using the invention of Hinz, Jr., supra, which enhances the ECC of Bossen, two TIE's can be simultaneously corrected without stopping the tape. This enhanced readback enables greater throughput when reading data signals from the media and supplying them to a connected data processing or communication system.

It is desirable for error control purposes to not only enhance the readback, but also the recording. That is, in a digital data recorder using read-after-write techniques for verifying proper recording, detection of an error condition in a recorded block of signals results in a so-called "write check." A write check causes the data processing system to move the tape and perform an erase gap function as taught by O'Brien in U. S. Pat. No. 2,975,407. Such operations require the connected system to retransmit data signals for re-recording. This action is in addition to requiring several tape motions which reduce the effective throughput of the digital data recorder. Accordingly, techniques are desirable that would reduce such re-recording for enhancing throughput of digital recorders having the above-described readback techniques with enhanced ECC facilities incorporated in the digital data recorder or in the digital data transmission system.

SUMMARY OF THE INVENTION

It is an object of the present invention to provide enhanced error control for a digital recorder and data communication system.

Methods and apparatus employing the present invention include an error detection and correction code having burst error detecting and correcting characteristics. Signals being transferred or recorded are divided into sets, with each set including block-type error detection and correction code bits. Additionally, quality of signal transfer or recording is established for subsets of signals within each of the sets. The error detection and correction code, during a signal transfer, detects up to k error conditions. These k error conditions (k is an integer) include error pointers, i.e., identification of subsets in error within each set. In a multitrack magnetic tape system, the subsets are tracks with the error pointers pointing to a track in error (TIE). At the same time, the quality of the readback from the magnetic recording (signal transfer) is also monitored, which also generates signals pointing to possible tracks in error or subsets in error. The pointers for each of the respective sets of the signal transfer are then compared. If there is a one-for-one pointer comparison and not more than k errors or no errors, then a satisfactory signal transfer or recording has been effected. If there are k+1 or more errors, then the signal transfer is unsatisfactory; and an error condition is indicated.

The above operation is particularly useful in magnetic recording systems wherein the quality of the record may degrade after the recording operation, such as caused by debris on the oxide or recording side of the media, creasing the media, and the like. By comparing the quality of the signals as detected from the media with the error detection and correction analysis, additional errors can be tolerated; the data may still be successfully recovered.

For example, the error detection and correction codes may correct k+n errors (k and n are integers) with quality signal error pointers as taught by Hinz, Jr., supra. Hence, if there are only k errors, the error detection and correction code can detect and correct k errors without the assistance of signal pointers. If the signal pointers correspond to the error detection and correction code pointers, then on successive signal transfers or readback from the magnetic record, it can be reasonably expected that such signal error pointers will again occur. Since these signal error pointers correspond to the pointers from the error detection and correction code, additional errors can be corrected assuming, of course, additional signal errors pointers will occur. The effecting of the code, then, is maximized for effecting a greater signal throughput.

The foregoing and other objects, features, and advantages of the invention will be apparent from the following more particular description of a preferred embodiment of the invention, as illustrated in the accompanying drawing.

THE DRAWING

DETAILED DESCRIPTION

Figure 1:
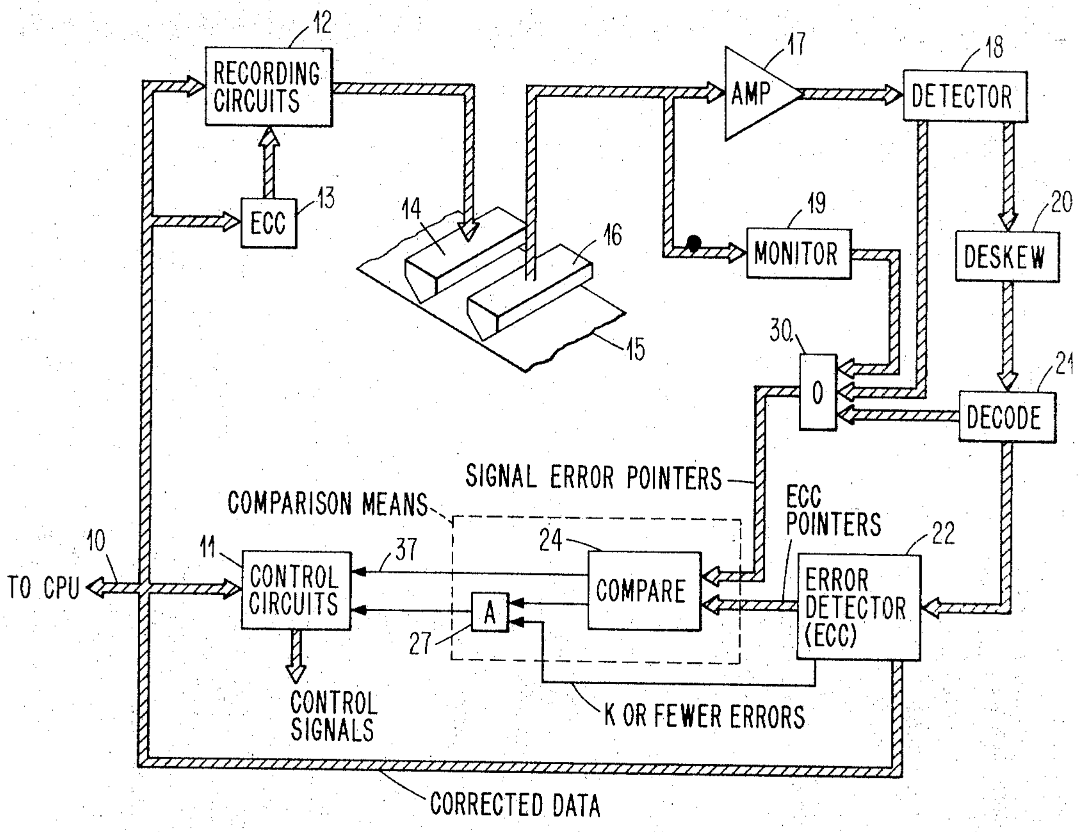
FIG. 1 is a simplified diagram of a system employing the present invention.
Figure 2:
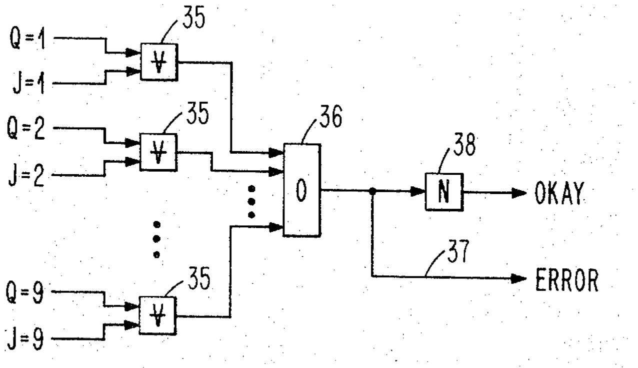
FIG. 2 is a simplified and abbreviated logic diagram of a comparator for generating error-indicating signals.

The present invention is best used and described with respect to a multitrack magnetic tape digital recorder. Details of such recorders are well known and are not further described in detail for that reason. Such digital recorders may connect to a data processing system or CPU via a channel or cable 10 which transfers digital data signals both to the recorder for recording and from the recorder after readback. During a recording operation, control circuits 11 have already responded to instruction signals from the connected CPU (not shown) for establishing a recording mode of operation in the I/O controller. Such a recording operation is described in Irwin '617. Control circuits 11 supply control signals to all of the units shown in FIG. 1 in accordance with Irwin '617. During the recording operation, data signals from CPU flow directly from cable 10 to recording circuits 12 and to error correction circuits 13 (ECC). ECC 13, constructed in accordance with the Bossen patent, supra, generates check bits to be recorded along with the data signals in sets of data signals as shown in FIG. 2 of Hinz, Jr. Recording circuits supply the signals to be recorded to head or recording transducer 14 for recording on magnetic media or tape 15 in accordance with known techniques.

Most multitrack digital data recorders have a write gap and a read gap for each record track. These recorders will sense, during a recording operation, signals just previously recorded to verify that a proper recording operation has been effected. Accordingly, read transducer 16 senses the signal just recorded by recording transducer 14 and supplies them through amplifier 17 for detection by detector 18. Monitor 19 also receives the read-after-write signals for indicating error-prone signal conditions, i.e., it generates signal error pointers (see Hinz, Jr., patent). Detector 18 supplies detected signals to deskewing circuits 20, which operate in a known manner or in accordance with the Floros patent, supra. The deskewed data bytes, i.e., eight bits in parallel plus parity, are supplied to decode 21 for conversion from a storage code to regular binary or data processing code. Recording circuits 12 include an encoder complementary to decode 21 as shown in Irwin +637. Decoded signals from decode 21 go to error detection circuits 22, constructed in accordance with the Bossen patent, supra. Upon receiving one set of data and check bit signals, error detection circuits 22 supply ECC error pointers to comparator 24. Comparator 24 is jointly responsive to such pointer signals and the signal error pointers from monitor 19, detector 18, and decode 21 to indicate an error condition or a satisfactory recording condition.

If there are no errors, or if there are k errors with corresponding or matching signal error pointers, an okay signal is supplied through AND circuit 27, thence, to control circuits 11. Control circuits 11 receive the okay signal and provide no action. If no okay signal is received, then control signals 11, in accordance with Irwin +617, supply a so-called write check signal to CPU 10 for error recovery procedures beyond the scope of the present description. Error detection circuits 22 also detect whether or not k+1 or more errors are detected. If less than this number is detected, an okay signal is supplied through AND circuit 27. Accordingly, if neither compare 24 nor error detector (ECC) 22 supplies an error signal, then control circuits 11 report no error condition, i.e., inform the CPU to proceed. If an error signal is received from either one, then circuits 11 supply the write check signal.

The Hinz, Jr., patent in FIG. 4 teaches several sources of signal error pointers usable as monitor 19. Additionally, detector 18 (which may be constructed in accordance with the Vermuelen patent, supra) includes integration-amplitude sensing circuits (not shown) for detecting whether or not an appropriate integration amplitude has been achieved. If the integration amplitude is too low (a low energy readback signal or phase-shifted signal is being detected), a signal error pointer is supplied to OR circuits 30 to be combined with monitor 19 error pointer signals. In a similar manner, decode 21 checks for illegal code combinations in the storage code. Such checking for illegal combinations in decoders is well known and is not further described. Upon detection of an illegal code value or combination, decode 21 supplies signal error pointers to compare 24 through OR circuits 30. Accordingly, compare 24 receives signal error pointers from several sources thereby ensuring that if there are any forms of error conditions, they are being checked against the ECC error pointers. Accordingly, if there are too many pointers, then a write check error condition is defined. This is important because of the subsequent degradation of the record after the recording operation has been completed. Accordingly, no write check condition corresponds to a high-quality signal recording even though a small number of errors may occur, such small number of errors being limited to particular circumstances having a relationship between the error detection codes and the actual signal conditions. In this manner, data integrity is preserved.

Compare 24 may be constructed as generally indicated in FIG. 2. The signal error pointers q, received from OR 30, are gated against the j error pointers from ECC 22 by a set of Exclusive OR circuits 35. Each Exclusive OR circuit 35 receives the corresponding pointer and ECC pointer; for example, in track 1, the signal error pointer is from the circuits associated with track 1, while the ECC pointer indicates that track 1 is in error. Other Exclusive OR's (not shown) respectively compare the signal error pointers and ECC pointers for the remaining tracks or data subsets.

When the two pointers for a given subset do not match, the respective Exclusive OR 35 supplies an activating signal to OR circuit 36, which combines all of the activating signals. OR 36 then supplies the combined signal as an error indication over line 37 to circuits 11. Additionally, the OR 36 output signal is inverted by NOT circuit 38 and supplied as an okay signal to AND 27, as previously referred to.

The illustrated FIG. 2 circuit detects only that one or more racks have signal error pointers not corresponding to ECC pointers. Hence, this is insufficient to make a valid determination that proper recording has been effected. Where there are k+1 errors, a recording error is indicated irrespective of how well the error-prone indicating signals match with the ECC error pointers. Accordingly, error detection circuits 22 supply an okay signal indicating not more than k errors have been detected. If this is the case, then the output of compare 24 is valid for indicating a satisfactory recording operation. On the other hand, if there are more than k errors, which exceeds the capacity of the error detection code without signal error pointers, ECC 22 removes its okay signal blocking the signal from compare 24 thereby causing control circuits 11 to request an error recovery procedure from CPU.

ECC 22 is constructed in accordance with the Bossen patent. The j pointers can be the terms "$B_j$" found in FIG. 6 of the Bossen patent, where *k* and *n* are 1. Accordingly, if the error correction code of Bossen detects two tracks or more in error, then no okay signal is supplied to AND 27. This corresponds to the circuitry in Bossen's FIG. 3 wherein two errors are detected. An error-free condition is indicated when syndromes S1 and S2 of Bossen are both zero. Hence, a single error condition is combined with a no-error condition to supply the okay signal.

While the invention has been explained particularly with respect to the Bossen error correction code, no limitation thereto is intended. For example, other codes may have a "k" value of 2 and an "n" value of 1. As newer codes are developed, the numbers k and n may increse. In such more powerful error correction codes having k>1, the write check criteria may be lowered for providing enhanced data integrity. As one example, where k=2 for a nine-track ½ inch tape digital recorder, the write check criteria may be maintained at one track in error as for the k=1 criterion for the Bossen code example. Any given error condition detected by the ECC apparatus combined with a greater number of pointer signals may yield a write check condition, i.e., indicates a possible ambiguous error correcting condition during signal readback—hence, a nonacceptable recording operation.

While the invention has been particularly shown and described with reference to a preferred embodiment therein, it will be understood by those skilled in the art that various changes in form and detail may be made therein without departing from the spirit and scope of the invention.

What is claimed is:

1. An error-control circuit for a digital recorder for verifying a magnetic recording operation, first means for recording digital signals on a magnetic record member identifiable in signal sets including error detection and correction code and data-representing signals;

second means for recovering signals in a read-after-write operation just recorded on said record member by said first means;

detection means for converting said read-after-write recovered signals to detected digital information-representing signals;

the improvement including in combination:

error detection means capable of correcting k+n errors and receiving said detected signals for detecting errors therein, and either indicating no errors, k errors and locations thereof, or k+1 or more errors in each said set, wherein *k* and *n* are nonzero integers;

quality signal means for detecting and indicating error-prone signal conditions in each said respective set; and comparison means jointly responsive to said error detection means and said quality signal means to indicate a recording error for k+1 or more detected errors or a non-comparision of said k error locations and said error-prone signal conditions and otherwise indicating acceptable recording.

2. The error-control circuit set forth in claim 1 wherein said digital recorder is a multitrack digital magnetic recorder system having each said signal set recorded in all tracks, each record track receiving a signal subset from each respective said signal set;

said quality signal means operating with each of said record tracks for indicating error-prone signal conditions in the respective record tracks (subset), one error-prone signal indication for each subset;

said error detection means supplying an ECC error pointer, one pointer corresponding to each said tracks; and said comparison means comparing the track pointers from said error detection means and said quality signal means to indicate acceptable or unacceptable recording with said unacceptable recording including error correctable recorded signal conditions.

3. The error-control circuit of claim 2 wherein said quality signal means further includes means monitoring said recovered signals and means monitoring data combinations of said recovered signals, and further including means combining said indications to indicate an error-prone signal condition from either of said monitoring means.

4. The error-control circuit of claim 2 wherein said comparison means compares said ECC error pointer and said error-prone signal indicator on a concurrent time basis for permitting such error-prone signal indications to become active at times other than said ECC error pointer without causing an unacceptable recording indication.

5. A signal condition indicator comprising:

means for receiving signals and segregating said signals into sets and subsets;

means for detecting information signals from said received signals;

error detection means responsive to said detected signals to indicate error conditions in said sets and, when a limited number of error conditions is detected, indicating errors occurring in particular ones of said subsets;

means for monitoring said received signals and for indicating error-prone signal conditions in the respective subsets and supplying indications thereof; and comparison means jointly responsive to said error detection means and said monitoring means indicating different subsets in error to indicate an improper reception of received signals.

6. The indicator set forth in claim 5 further including AND means receiving said comparison means indicator signal of received signals;

said error detection means indicating whether or not fewer than k signal subsets are in error, where k is an integer greater than one; and said AND means being jointly responsive to said received signal error indicator signal indicating different subsets in error or k or greater errors to indicate an error.

7. The method of recording signals on a magnetic media;

dividing said signals into sets and subsets with each set of signals having error detection and correction code bits;

recording signals on a record member;

verifying the quality of the signals being recorded as exceeding a certain threshold by indicating a possible signal error condition for each of the respective subsets not reaching said threshold;

comparing the data signals with the error detection and correction code bits as recorded; and comparing said signal error pointers with said error detection for indicating unsatisfactory recording has occurred requiring a rerecording whenever there is a predetermined lack of comparison and satisfactory recording not requiring a rerecording when such comparison matches even though there are error conditions.

8. The method set forth in claim 7 further dividing said sets along a plurality of parallel tracks on a magnetic recording media; and causing said subsets to lie among the tracks such that at least one signal in each subset is from each track, and causing said quality signal to be associated with each said track and the respective subset across said media.

9. The method set forth in claim 8 wherein said error detection and correction code bits are capable of correcting a plurality of tracks in error in association with said quality signals; and said predetermined lack of comparison indicating an unsatisfactory recording whenever either (1) said plurality of tracks is in error irrespective of said comparison or (2) one less than said plurality of tracks is in error with any mismatch between any error detection pointed to track in error and said any of said quality signal error pointers.

10. The method of recording digital signals on a record media;

including the steps of:

recording digital data signals and associated digital check bit signals on said record media;

determining the quality of recording of said digital signals and the error status thereof; and comparing the quality and error status and indicating a rerecording is necessary when comparison indicates said quality and status indicate different error locations, and an acceptable recording whenever there are no errors indicated by said status or there is a match of indicated error locations up to a predetermined number of errors.

* * * * *